Nov. 6, 1934.    F. R. SMITH    1,979,288
METHOD OF FORMING COLLARED APERTURES IN SHEET METAL
ARTICLES INCLUDING CHRONOMETER INDICATORS
Filed Feb. 20, 1933    2 Sheets-Sheet 1
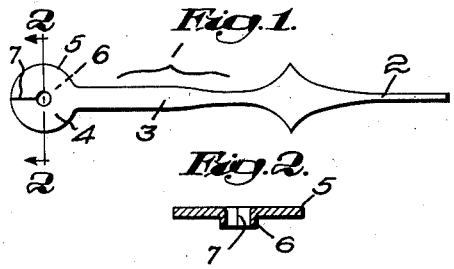
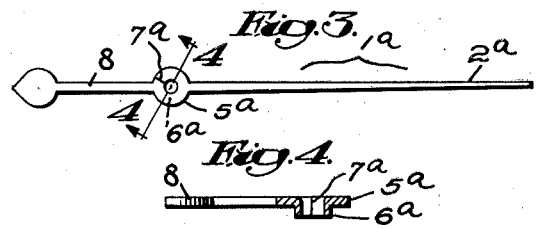
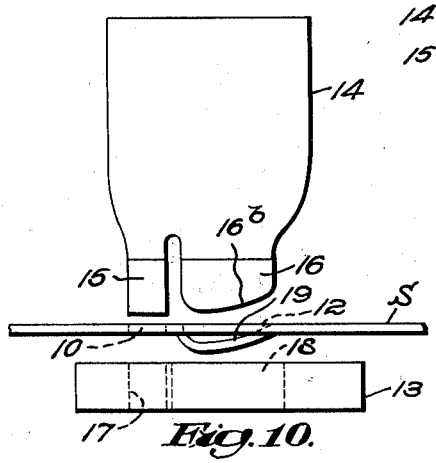
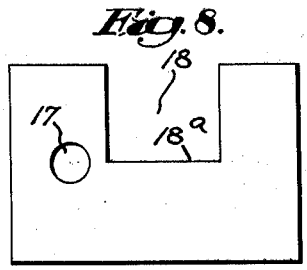
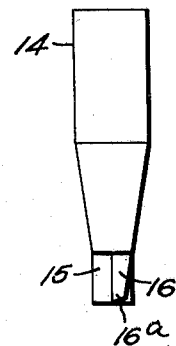
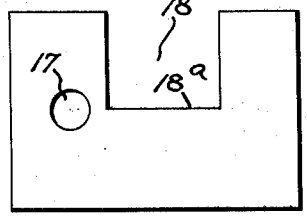
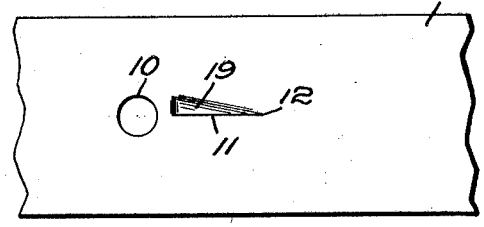
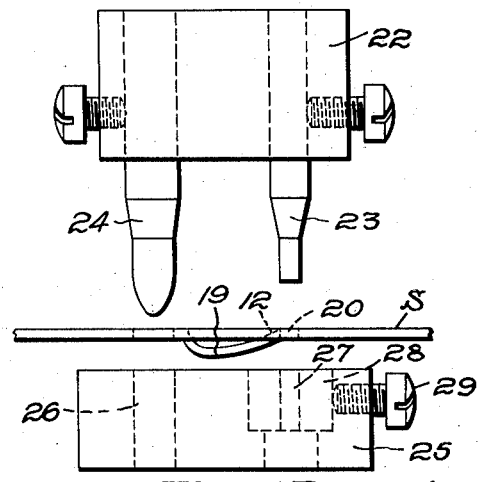
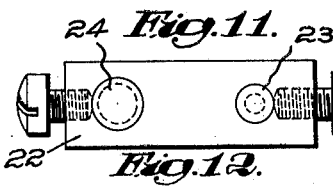
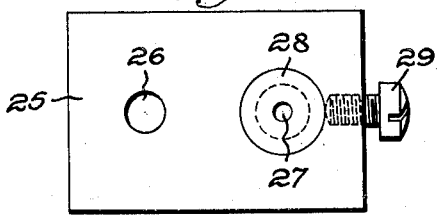
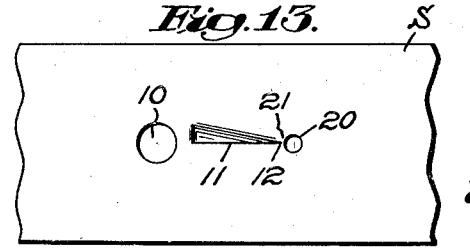
Inventor:
Francis R. Smith,
by Emery, Booth, Varney & Townsend
Attys Nov. 6, 1934. F. R. SMITH 1,979,288
METHOD OF FORMING COLLARED APERTURES IN SHEET METAL
ARTICLES INCLUDING CHRONOMETER INDICATORS
Filed Feb. 20, 1933  2 Sheets-Sheet 2
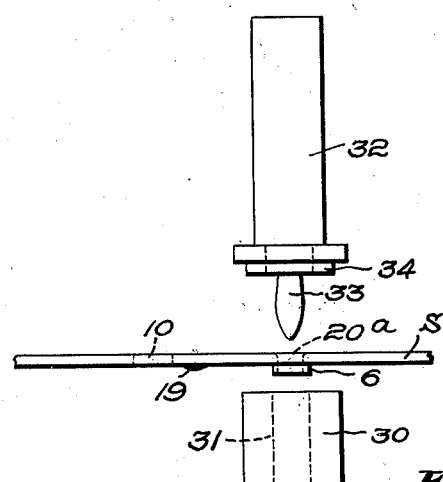
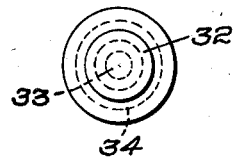
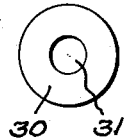
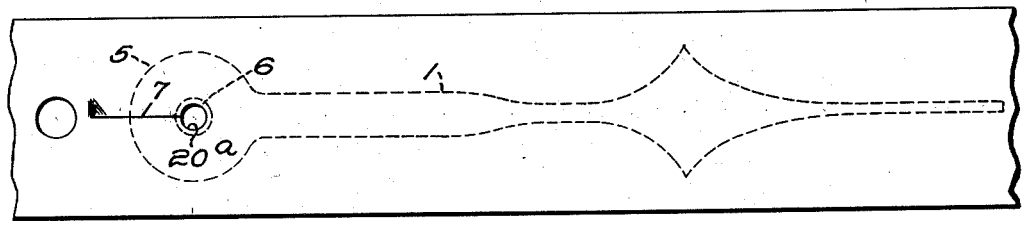
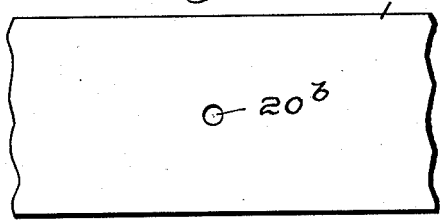
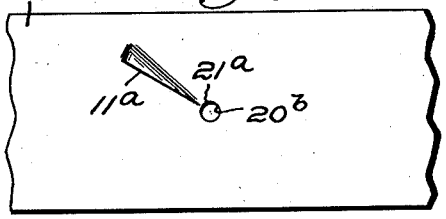
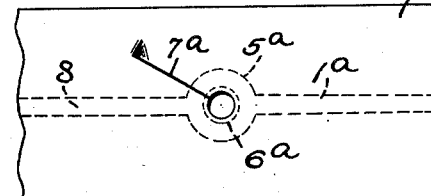
Inventor:
Francis R. Smith,
by Emery, Booth, Varney & Townsend
Attys Patented Nov. 6, 1934

1,979,288

UNITED STATES PATENT OFFICE 1,979,288

METHOD OF FORMING COLLARED APERTURES IN SHEET METAL ARTICLES INCLUDING CHRONOMETER INDICATORS

Francis R. Smith, Wakefield, Mass.

Application February 20, 1933, Serial No. 657,588

4 Claims. (Cl. 113—116)

My present invention relates to methods of forming collared apertures in sheet metal articles, such, for example, as indicators or pointers and the like for chronometers, recorders and other mechanisms having movable indexes, pointers or "hands." It aims to afford simplified and otherwise improved methods of making collared apertures, such as for receiving shafts, arbors or other elements, in sheet metal articles including those of the class mentioned and others requiring such collared formations. Claims for the devices or articles themselves are contained in my copending application Serial No. 712,859, made necessary by reason of the final official requirement for division as between the method and the article claims respectively relating to distinct and independent inventions.

In the drawings, illustrating by way of example certain embodiments of the invention, together with means by which the methods thereof may be practiced, Fig. 1 is a plan of an indicator, pointer or hand, embodying one form of my invention, the same being shown as of the unbalanced type;

Fig. 2 is an enlarged section on the line 2—2 of Fig. 1;

Fig. 3 is a plan of an indicator, pointer or hand of the balanced type, also embodying my invention;

Fig. 4 is an enlarged section on the line 4—4 of Fig. 3;

Figs. 5 to 9 inclusive are related figures illustrating an initial step or initial steps of my method. In said figures, Fig. 5 is a side elevation showing the work or blank, the die, and the punch or set in operative relation;

Fig. 6 is a plan of the punch or set;

Fig. 7 is an end elevation of the latter as viewed from right to left in Figs. 5 and 6;

Fig. 8 is a plan of the die; and

Fig. 9 is a plan of the work or blank in the condition after being operated on by the die and punch or set of Figs. 5 to 8.

Figs. 10 to 13 inclusive illustrate a further step in the practice of my method, and suitable tools for carrying out the same. In said Figs. 10 to 13, Fig. 10 is a side elevation corresponding to Fig. 5, showing the work or blank, the die and the punch or set in operative relation;

Fig. 11 is a plan of the punch or set;

Fig. 12 is a plan of the die; and

Fig. 13 illustrates the condition of the work or blank after operation of the tools of Figs. 10 to 12.

Figs. 14 to 17 illustrate a further operation in accordance with the method of my invention. In said Figs. 14 to 17, Fig. 14 is a side elevation corresponding to Fig. 5 and to Fig. 10, showing the work or blank, the die and the drawing tool or set, in operative relation;

Fig. 15 is a plan of the drawing tool or set;

Fig. 16 is a plan of the die; and

Fig. 17 shows the work or blank in its condition after operation of the tools of Figs. 14 to 16, one design of finished indicator appearing in dotted line.

Figs. 18 to 23 illustrate certain steps and progressive conditions of the blank for the formation of an indicator of the balanced type, such as that of Figs. 3 and 4. In said figures, Figs. 18 and 19 are respectively an edge view and a plan of the work or blank in its initial stage;

Figs. 20 and 21 are views corresponding to Figs. 18 and 19 respectively, illustrating another operation; and Figs. 22 and 23 are similarly corresponding views showing a further step in the practice of my method.

Referring first to Figs. 1 and 2, the indicator there shown, represented as a whole by the numeral 1, includes a head or indicating end 2, a shank 3, and a hub 4. Devices of this class are of two main types, considered with reference to their manner of mounting on a spindle, arbor or shaft, namely, those having a non-circular hub aperture for reception on a like shaped rotating support, and those having a circular hub aperture, for frictional mounting on their correspondingly shaped arbor or other supporting member. My invention is concerned primarily with indicators of the second type, that is, for frictional mounting.

Heretofore indicators of this frictional mounting type have either had continuous non-slotted hubs, or have been provided with radial slots or cut out formations in their hubs, to afford a clamping or frictional gripping action upon the shaft or arbor. Such radial slot has been made by sawing, cutting or otherwise removing a portion of metal, leaving a distinct gap in both the flange and the collar portions of the hub, which is objectionable for various reasons and detracts from the appearance of the indicator. The non-slotted indicators, with circular hub apertures, have lacked the desired clamping capacity.

In the indicators of my invention, and in accordance with the methods thereof, the flange and collar of the indicator hub are expansible, for the desired clamping action, but have little or no metal removed, the separated portions being left in abutting or substantially abutting relation, so that the line of separation is scarcely visible or may be seen only with difficulty.

In Figs. 1 and 2 the hub flange is indicated at 5 and the collar or draw at 6. The radial line of interruption or separation of these parts is indicated by the line at 7, which line, due to the necessities of illustration, is rather more pronounced or somewhat exaggerated as compared with the actual device, in which, as stated, it is, to all intents and purposes, substantially invisible. It will be noted that the separated portions of the flange 5 abut or substantially meet, at the upper surface of the flange, as viewed in Fig. 1, and that this substantial abutting or meeting of the parts, see Fig. 2, is complete through the entire height of the collar or draw 6, although the degree of approach of the parts in the collar, or at least in the lower portion thereof, is less important, and some minor separation is not objectionable and remains within the scope of my invention.

In Figs. 3 and 4, illustrating an indicator of the balanced type, the parts corresponding to those of Figs. 1 and 2 are similarly numbered, with the addition of the reference character $a$. The balancing portion or extension of the indicator is seen at 8. With either the unbalanced or balanced type of indicator it will be apparent from Figs. 1 and 2 and Figs. 3 and 4 that in accordance with my invention the indicators comprise an expansible or clamping hub which is nevertheless closed or substantially so.

In Figs. 5 to 17 I have illustrated the several operations or steps in the formation of an indicator of the unbalanced type, such as that of Figs. 1 and 2, following one method of my invention. Referring first to Figs. 5 to 9, the indicator is formed from a blank or sheet metal strip S. The initial operation or operations preferably include the formation in the blank of a pilot hole 10, Figs. 5 and 9, and the making of a cut or shear line 11 in diametral or other selected alignment with the pilot hole and having its outer end 12, that away from the pilot hole, at a predetermined and accurately adjustable distance from the center of the pilot hole. Said formations 10 and 11 may be variously made, either simultaneously or separately.

In Figs. 5 to 8 I have illustrated for the purpose a die 13 and a combined punch and shear set 14. The latter comprises the punch 15 for forming the pilot hole 10 and the shear element 16 which produces the cut or slit 11. The die 13 is formed with the corresponding female parts 17 and 18 for the reception of said elements 15 and 16 respectively; see Fig. 8. The female or die portion 18, for cooperation with the shear element 16, as clearly seen in said Fig. 8, comprises a recess having its inner wall $18^a$ in line with an extended diameter of the punch receiving portion 17 of the die. By reference to Figs. 6 and 7, and particularly Fig. 7, it will be seen that the shear element 16 is provided with a straight sharp cutting edge $16^a$ to afford a sharp, clean cut in cooperation with the portion $18^a$ of the die. The shear element 16 also preferably inclines, in the direction of the cut, see Fig. 5, it being deeper at its portion adjacent the punch 15 and inclining upwardly away from the latter, as indicated at $16^b$. By reason of this construction the length of the cut may be accurately adjusted, by varying and accurately predetermining the depth to which the tool 14 is operated.

In Figs. 5 and 9 the blank or work S is shown after operation of the tools of Figs. 5 to 8 upon it, the metal then having received the pilot hole 10, the cut or slit 11, from which latter a small portion of the metal has been struck down at one side, as indicated at 19 in Figs. 5 and 9.

The operation illustrated separately in Figs. 10 to 13, but which need not necessarily be performed as a separate operation, provides for the formation of a drawing aperture 20, Figs. 10 and 13, at a point close to the end 12 of the cut or slit 11 and in intersecting or diametral alignment with the latter, but so positioned that the cut end 12 does not actually enter the aperture, some metal being left between them as indicated at 21 in Fig. 13. For accomplishing this, I have illustrated in Figs. 10 to 12 a punch set 22 removably carrying a solid circular punch 23 for the drawing hole 20, and a guide 24 adapted to enter the pilot hole 10 in the blank. The punch 23 and guide 24 are each of the desired size and are so spaced that the guide 24, which projects below the punch 23, on entering the pilot hole 10, will positively locate the punch 23 with respect to the end of the cut 11, so that the drawing hole 20 is made closely adjacent but to some slight extent spaced from the end 12 of the cut.

Cooperating with the guide and punch set 22 is a die 25 having a receiving aperture 26 for the guide 24 and a recess 27 for the punch 23. Said recess or female portion of the die is desirably formed in a separate and replaceable piece 28 held in place by a set screw 29, as are also the guide 24 and punch 23. Different sizes of dies, punches and guides may thus be provided, to suit the particular circumstances and size of indicator.

Following the operation of the tools illustrated in Figs. 10 to 12, the condition of the work or blank S is as illustrated in Fig. 13, the drawing aperture 20 and the cut 11 being spaced by the metal 21 between them.

The blank is now ready for the drawing and sizing operation which I have also here shown as a separate step, in Figs. 14 to 17, but which may be otherwise performed, for example, in connection with sub-press dies or by progressive dieing. During this operation the draw or collar 6 is formed and shaped to the desired inside diameter and the hub is completed, the blank being left in readiness for stamping or otherwise forming the complete indicator in accordance with the pattern and size desired. One form of tool for performing this drawing and sizing operation is shown in Figs. 14 to 16. It includes a die 30 recessed as at 31 on a diameter corresponding to the desired counter diameter of the collar or draw to be formed. The male element or set cooperating with the die 30 comprises the holder 32, the drawing punch 33 and a presser or disc 34 above the latter. These parts are preferably replaceably positoned in the holder 32.

The tool parts 33 and 34 are so constructed and arranged, and the spacing of the drawing aperture 20 and cut 11 as previously described is such, with relation to the thickness of the blank, that the drawing tool will just break the metal 21 through between the aperture 20 and cut as the draw or protruding collar is brought down to the full extent desired, completing it. At substantially the same time, as herein shown, but not necessarily so, the presser 34 comes down upon the blank, closing the final slit formation 7 and flattening the previously protruding portion 19 into the original plane of the blank, over an area at least as large as that desired for the flange 5 of the particular indicator. It will thus be understood that no tool is ever entered into the cut or slit 7, either in the flange or the collar portion of the indicator hub. Hence, these parts, while actually cut or separated, to afford the clamping function, remain in absolute or substantial abutting relation, closed together without an objectionable gap.

The resulting condition of the blank is that shown in Figs. 14 and 17, wherein the interrupted but closed collar 6 has been completely formed and the drawing aperture has been enlarged to the desired shaft or arbor-receiving opening, as indicated at 20ª. Any desired form or design of balanced indicator may then be stamped or otherwise formed from the blank, one such as that illustrated in Fig. 1 being shown in dotted outline in said Fig. 17.

The drawing element 33 is preferably formed substantially as shown, with a slightly narrowing taper at its upper portion, being of maximum width at about midheight. This portion of maximum width is so located that it may pass completely through the blank and slightly below the collar 6, so that in returning it will tend automatically to lift the work out of the die 30. This overcomes the necessity for separate manipulation of the blank to free it from the die and avoids possibility of bending, springing or deforming the work.

In the formation of an indicator of the balanced type the slit or break line in the flange and collar of the hub is necessarily disposed at an angle to the axis of the shank, but in other respects the construction and method of producing it may be substantially as previously described in connection with Figs. 1 and 2 and 5 to 17 inclusive. The angular disposition of the slit 7ª, Figs. 21 and 23, may be obtained, with the use of the same tools as previously described, by feeding the blank strip or work at an angle with respect to the tools of Figs. 5 and 10, or by using a wider strip, or, as in the illustrated instance, the pilot aperture 10 may be dispensed with. In such case, the draw hole 20ᵇ is made at the desired point on the strip and may itself be used as a pilot or guide aperture in the locating and forming of the cut 7ª, at the proper distance from it, as indicated at 21ª, Fig. 21. For that purpose the tool is similar to that of Figs. 5 to 7, with the punch 15 substituted by a guide 24 of the appropriate diameter and with the shear element 16 reversed to have its shorter side adjacent the guide, and at the desired angle to it. In both instances, that is, with either the balanced or unbalanced indicator, this spacing of the draw aperture and cut, and the drawing operation are such that the intervening metal is broken through at or substantially at the last stage of the draw, leaving the substantially completely closed hub as already described.

My invention is not limited to the particular embodiment illustrated and the methods thereof may be otherwise performed than by the particular mechanism illustrated and described, its scope being set forth in the following claims.

I claim:—

1. That method of forming an indicator for chronometers, recorders and the like comprising the following steps: forming in a sheet metal blank a straight, through cut of a length at least equalling that of the diameter of the hub flange to be formed; placing in the blank a draw aperture closely adjacent but spaced from one end of said cut by intervening metal; and drawing down about said draw aperture a collar of the desired depth and in such manner that the intervening metal between the draw aperture and the cut is broken through as the draw is completed.

2. That method of forming an indicator for chronometers, recorders and the like comprising the following steps: forming in a sheet metal blank a draw aperture and a through cut of a length at least equalling that of the diameter of the hub flange to be formed, the cut extending lengthwise outwardly from the aperture and being close to but spaced by intervening metal from the aperture at its inner end; and drawing a collar concentric with said aperture and breaking through the metal between the draw aperture and said cut, in the drawing operation.

3. That method of forming an indicator for chronometers, recorders and the like comprising the following steps: forming a through aperture in a sheet metal blank; forming a through cut transversely of the indicator hub flange to be formed while guiding and locating the cut forming tool, to bring one end of said cut to an accurately predetermined point, and drawing an apertured collar at said end of the cut in such manner that the metal is broken through into the cut during the drawing operation.

4. That method of forming in a sheet metal article a friction-clamping receiving formation having a peripheral collar which comprises forming in said blank a through cut and a through aperture to be provided with a peripheral collar, said cut being along a line which prolonged would intersect said aperture but said cut being terminated at an accurately determined point with respect to the position of the edge of the aperture, and drawing a collar surrounding said aperture and in such manner as to break through the metal into the adjacent end of said cut during the drawing operation.

FRANCIS R. SMITH.